United States Patent [19]

Langer, Jr.

[11] 4,391,738

[45] Jul. 5, 1983

[54] CATALYST FOR OLEFINIC POLYMERIZATION

[75] Inventor: Arthur W. Langer, Jr., Watchung, N.J.

[73] Assignee: Exxon Research and Engineering Co., Florham Park, N.J.

[21] Appl. No.: 343,570

[22] Filed: Jan. 28, 1982

Related U.S. Application Data

[63] Continuation of Ser. No. 790,837, Apr. 25, 1977, abandoned, which is a continuation-in-part of Ser. No. 767,749, Feb. 11, 1977, abandoned.

[51] Int. Cl.$^3$ .......................... C08F 4/02; C08F 10/00
[52] U.S. Cl. .................... 252/429 B; 252/429 C; 526/119; 526/125; 526/139; 526/140; 526/141; 526/142; 526/151; 526/351; 526/906
[58] Field of Search ...................... 252/429 B, 429 C; 526/119, 125, 139–142, 151

[56] References Cited

U.S. PATENT DOCUMENTS 3,113,115 12/1963 Ziegler et al. ...................... 526/159
3,238,146 3/1966 Hewett et al. ...................... 526/125
3,880,817 4/1975 Van den Berg ...................... 526/151

FOREIGN PATENT DOCUMENTS 1235062 6/1971 United Kingdom ................ 526/151
1286867 8/1972 United Kingdom ................ 526/125
1292853 10/1972 United Kingdom ................ 526/125
1436426 5/1976 United Kingdom ................ 526/124

Primary Examiner—Edward J. Smith
Attorney, Agent, or Firm—Richard E. Nanfeldt

[57] ABSTRACT

A new improved catalyst system for alpha-olefin type polymerizations includes a metal alkyl compound selected from the group consisting of $R_2WY$ or $R_3W$ and an organomagnesium compound R'MgX in combination with a Group IVB-VIII transition metal compound. The improved catalyst system provides both increased polymerization activity and polymers having a high degree of isotactic stereoregularity.

1 Claim, No Drawings

CATALYST FOR OLEFINIC POLYMERIZATION

CROSS REFERENCE TO RELATED APPLICATIONS

This is a continuation, of application Ser. No. 790,837, filed Apr. 25, 1977, which is a continuation-in-part of Ser. No. 767,749, filed Feb. 11, 1977, both now abandoned.

FIELD OF THE INVENTION

A new improved catalyst system for use with Group IVB-VIII transition metal halides for alpha-olefin type polymerizations includes a metal alkyl compound selected from the group consisting of $R_2WY$ or $R_3W$ and mixtures thereof and a mono-organomagnesium compound $R'MgX$, wherein W is selected from the group consisting of Al, Ga, and In; R is selected from the group consisting of $C_1$ to $C_{20}$ alkyl, branched alkyl, cycloalkyl, aralkyl, alkenyl or allyl groups and may also contain Lewis base functionality; $R'$ is selected from the group consisting of $C_1$ to $C_{20}$ alkyl, branched alkyl, cycloalkyl, naphthenic, aryl, aralkyl, allyl and alkenyl groups and may also contain Lewis base functionality; Y and X are selected from the group consisting of a monovalent anion which cannot initiate polymerization of olefins, such as Cl, Br, I, $OR''$, $SR''$, and $OOCR''$, wherein $R''$ is selected from the group consisting of $C_1$ to $C_{20}$ alkyl, branched alkyl, cycloalkyl, aryl, naphthenic, aralkyl, alkyl and alkenyl groups.

The improved catalyst system provides increased polymerization activity and polymer isotactic stereoregularity.

BACKGROUND OF THE INVENTION

There is extensive art on the polymerization of ethylene and higher alpha-olefins, including dienes, using Ziegler type catalysts containing either alkyl metals or alkyl metals in which an alkyl group has been replaced by X, OR, SR, $NR_2$, etc., in combination with a transition metal compound of Groups IVB-VIII, where X=halide, and R=$C_1$ to $C_{20}$ hydrocarbyl substituent.

For the commercial stereospecific polymerization of propylene and higher alpha olefins, only a few alkyl metal compounds have been found effective in combination with titanium or vanadium chlorides. Commercially, only $R_2AlCl$ or $R_3Al$ are used together with a crystalline form of $TiCl_3$ or $TiCl_3.nAlCl_3$. Mixtures of $R_3Al$ and $R_2AlCl$ and $RAlCl_2$ are made in situ and have been disclosed as catalyst components frequently in the art. However, $RAlCl_2$ is known to be a catalyst poison (A. Caunt, J. Polymer Sci. C4, 49 (1963).) R is preferably ethyl (Et) or isobutyl; N=0.01 to 0.75.

This inventor's U.S. Pat. No. 3,418,304 discloses a complex of alkyl metal compounds such as $Et_2AlNEt_2$ and Lewis acid salts such as $AlCl_3$ and $MgCl_2$, e.g. $Et_2AlNEt_2.AlCl_3$ as cocatalysts to entirely replace conventional aluminum alkyls, but such complexes are entirely different from the concept of utilizing organomagnesium compounds in combination with a Group III metal alkyl compound as catalyst supplements for Ziegler systems employing Ti metal transition halide.

U.S. Pat. No. 3,638,897 teaches a catalyst system for the polymerization of alpha-olefins which includes a titanium compound, an alkyl aluminum halide compound, and a metal halide; however, this patent fails to recognize the use of an organomagnesium compound as an integral part of the catalyst system.

SUMMARY OF THE INVENTION

The present invention relates to unique and novel catalyst systems for the conventional alpha-olefin type polymerization at significantly improved polymerization activity, wherein the resultant polymers have a high degree of isotactic stereoregularity.

An object of my present invention is to provide improved catalyst systems having a major increase in polymerization activity while being able to control over a wide range the polymer crystallinity, e.g. isotacticity, wherein the catalyst system includes a transition metal compound, a mono-organomagnesium compound, and a metal di- or trialkyl compound of Al, Ga, or In.

A further object of my present invention is to provide an improved process for alpha-olefin type polymerizations, wherein the polymerization activity is increased and the formed polymer has a high degree of isotactic stereoregularity.

A still further object of my present invention is the advantage of being able to use directly the new improved catalyst with any type of transition metal compound without substantial modification of the commercial catalyst preparation or the polymerization plant.

GENERAL DESCRIPTION

It is well known in the art to use an alkyl metal compound of Groups I-III in combination with a transition metal compound of Groups IVB-VIII as a catalyst system for olefinic polymerization. While nearly all of the alkyl metal compounds are effective for the polymerization of ethylene, only a few are effective for the preparation of isotactic polymers of propylene and higher alpha olefins and only $Et_2AlCl$ and $AlEt_3$ have any important commercial utility.

A major cost involved in the polymerization of the alpha olefins is the cost of the catalyst components. Therefore, the cost of the manufacture of the polymer can be effectively reduced by the use of catalyst systems having a higher polymerization activity. A further concern is the ability to produce polymers having a minimum amount of catalyst residues thereby eliminating a costly deashing operation. A still further concern is the ability to produce polymers having a high degree of isotactic stereoregularity thereby enabling the manufacturer to eliminate the costly operation involving the removal and separation of atactic polymer from the isotactic polymer. The improved catalyst system of the present instant invention provides a means to the manufacturer of obtaining these desirable realizations.

The improved catalyst systems of the present invention which are employed in alpha-olefin polymerizations include a Group IVB-VIII transition metal compound, a metal di- or trialkyl compound of Al, Ga, or In, and a mono-organomagnesium compound.

The transition metal catalyst compound is a Group IVB-VIII transition metal halide, wherein the halide group is chloride or bromide and the transition metal halide is in the form of solid crystalline compounds, solid solutions or compositions with other metal salts or supported on the surface of a wide range of solid supports. For highest stereospecificity it is desirable to have the transition metal halide, or its support composition, in the layer lattice structure with very small crystallites, high surface area, or sufficient defects or foreign components to facilitate high dispersion during polymerization. The transition metal halide may also contain various additives such as Lewis bases, pi bases, polymers, or organic or inorganic modifiers. Vanadium and titanium halides such as $VCl_3$, $VBr_3$, $TiCl_3$, $TiCl_4$, $TiBr_3$ or $TiBr_4$ are preferred, most preferably $TiCl_3$ or $TiCl_4$ and mixtures thereof. The most preferred $TiCl_3$ compounds are those which contain $TiCl_4$ edge sites on the layer lattice support such as alpha, delta, or gamma $TiCl_3$ or various structures and modifications of $TiCl_3$ or $MgCl_2$. The most preferred $TiCl_4$ compounds are those supported on chloride layer lattice compounds such as $MgCl_2$. Minor amounts of other anions may be also present such as other halides, pseudo-halides, alkoxides, hydroxides, oxides or carboxylates. Mixed salts or double salts such as $K_2TiCl_6$ or $MgTiCl_6$ can be employed alone or in combination with electron donor compounds. Other supports besides $MgCl_2$ which are useful are hydrochlorides, oxides or other inorganic or organic supports. The most preferred crystal structure of $TiCl_3$ is delta or pseudo delta, the latter being a mixture of alpha and gamma crystallites. The $TiCl_3$type catalysts may be prepared from $TiCl_4$ by any one of the reduction and crystallization procedures known in the art ($H_2$, metal, metal hydrides, metal alkyls, etc.). "Low aluminum" containing $TiCl_3$ refers to $TiCl_3$ catalysts which have low Al content because of the method of formation or because a major portion of the aluminum was removed in subsequent reactions.

For the alkyl metal cocatalysts of this invention, the most preferred transition metal compounds contain $TiCl_4$ supported on $MgCl_2$ and optionally, one or more Lewis bases.

The metal alkyl compounds are selected from the group consisting essentially of a metal alkyl compound selected from the group consisting of $R_2WY$ or $R_3W$ and mixtures thereof, wherein W is selected from the group consisting of Al, Ga and In, R is selected from the group consisting of $C_1$ to $C_{20}$ alkyl, secondary alkyl, branched alkyl, tertiary alkyl, cycloalkyl, naphthenic and aryl or aralkyl groups which may also contain a Lewis base functionality, Y is selected from the group consisting of a monovalent anion which cannot initiate polymerization of olefins, such as Cl, Br, I, $OR''$, $SR''$, and $OOCR''$, wherein $R''$ is selected from the group consisting of $C_1$ to $C_{20}$ alkyl, branched alkyl, cycloalkyl, aryl, naphthenic, aralkyl and alkenyl groups, Y is more preferably Cl, Br or I and most preferably Cl. Typical but non-limiting examples are diethyl aluminum chloride, aluminum triethyl, diethylaluminum bromide, diethylaluminum iodide, diethylaluminum benzoate, diisobutylaluminum hydride, dioctylaluminum chloride, diethylgallium butoxide, diethylindium neodecanoate, triethylindium, dibenzylaluminum chloride and mixtures thereof. Mixtures of metal alkyl compounds can be readily employed. The $C_2$-$C_4$ alkyl aluminum compounds are preferred for high stereospecificity, and the dialkyl aluminum chlorides are most preferred.

The mono-organomagnesium compound has the general formula $R'MgX$ wherein $R'$ is selected from the group consisting of $C_1$ to $C_{20}$ alkyl, secondary alkyl or tertiary alkyl, branched alkyl, cycloalkyl, naphthenic, aryl, aralkyl, alkenyl and allyl groups. X is selected from the group consisting of an anion which cannot initiate polymerization of olefins, such as Cl, Br, I, $OR''$, $Sr''$, and $OOCR''$, wherein $R''$ is selected from the group consisting of $C_1$ to $C_{20}$ alkyl, branched alkyl, cycloalkyl, naphthenic, aryl, aralkyl, allyl and alkenyl groups. Typical, but non-limiting examples are s-BuMgCl, t-BuMgCl, s-BuMgOOCC$_6$H$_5$, s-BuMgOC$_{15}$H$_{31}$, EtMg neodecanoate, n-BuMgOOCC$_6$H$_5$, n-hexyl MgCl, n-hexyl MgOOCC$_9$H$_{19}$, benzyl MgCl, crotyl MgOOC, and mixtures thereof. Mixtures of organomagnesium compounds can be readily employed. The most preferred X groups are $OR''$ and $OOCR''$ and the most preferred $R'$ groups are secondary or tertiary alkyls.

Additionally, Lewis bases can be employed in the combination with the metal alkyl compound of Al, Ga and In, the organomagnesium compound and/or the Group IVB-VIII transition metal compound as long as they do not cause excessive cleavage of metal-carbon bonds, or loss of active sites, wherein the Lewis base is selected from the group consisting of tertiary amines, esters, phosphines, phosphine oxides, phosphates (alkyl, aryl), phosphites, hexaalkyl phosphoric triamides, dimethyl sulfoxide, dimethyl formamide, secondary amines, dialkyl ethers, epoxides, saturated and unsaturated heterocycles, or cyclic ethers and mixtures thereof. Typical but non-limiting examples are diethyl ether or tetrahydrofuran.

Magnesium salts may also be employed with the instant catalysts if they are partially or wholly solubilized by reaction with the alkyl metal components. Non-limiting examples include $MgBr_2$, $ClMgOR''$, $R''OMgOOCR''$, $Mg(OR'')_2$, and the like.

The molar ratio of the organomagnesium compound to the metal alkyl compound ($R_2WY$ or $R_3W$) is about 10:1 to about 1:10 more preferably about 2:1 to about 1:2, most preferably about 1:1. The number of moles of Lewis base can vary widely but is preferably equal to or less than the sum of the moles of the metal alkyl compound and the organomagnesium compound. The molar ratio of the metal alkyl compound or the organomagnesium compound to the transition metal compound is less than about 20:1 and more preferably less than about 10:1.

The catalyst system of the invention enables the process for making alpha olefin polymers having a high degree of isotacite steroregularity to be carried out at a temperature of about 25° to about 150° C., more preferably about 40° to about 80° C., at pressures of about 1 atm. to about 50 atm. The reaction time for polymerization is about 0.1 to about 10 hours, more preferably about 0.5 to about 3 hours. Due to the high catalyst activity, shorter times and temperatures below 80° C. can be readily employed.

The reaction solvent for the system can be any inert paraffinic, naphthenic or aromatic hydrocarbon such as benzene, toluene, xylene, propane, butane, pentane, hexane, heptane, cyclohexane, and mixtures thereof. Preferably, excess liquid monomer is used as solvent. Gas phase polymerizations may also be carried out with or without minor amounts of solvent.

Typical, but non-limiting examples of $C_2$-$C_{20}$ alphaolefinic monomers employed in the present invention for the manufacture of homo-, co- and terpolymers are ethylene, propylene, butene-1, pentene-1, hexene-1, octadecene-1, 3-methylbutene-1, styrene, vinylidene norbornene, 1,5-hexadiene and the like and mixtures thereof. Isotactic polymerization of propylene and higher olefins is especially preferred.

The metal alkyl compound and organomagnesium compound can be added separately to the reactor containing the transition metal compound but are preferably premixed before addition to the reactor. Employing either the metal alkyl compound or the organomagnesium compound alone with the transition metal compound does not provide the improved catalyst efficiency and stereospecificity as envisioned in this application. In order to attain this, it is necessary to employ both the metal alkyl compound and organomagnesium compound in combination with the transition metal compound in the proportions previously defined. The concentration of the transition metal in the polymerization zone is about 0.001 to about 5 mM, preferably less than about 0.1 mM.

DETAILED DESCRIPTION OF THE PREFERRED EMBODIMENTS

The advantages of the unique and novel catalyst system and the novel process for the alpha-olefin polymerizations of the present instant invention can be more readily appreciated by reference to the following examples and tables.

EXAMPLE I

Polymerizations were carried out in a 1 liter baffled resin flask fitted with a reflux condenser and stirrer. In a standard procedure for propylene polymerizations, 475 ml n-heptane (<1 ppm water) containing the alkyl metal cocatalysts was charged to the reactor under $N_2$, heated to reaction temperature (65° C.) while saturating with propylene at 765 mm pressure. The powdered transition metal catalyst was charged to a catalyst tube such that it could be rinsed into the reactor with 25 ml n-heptane from a syringe. The propylene feed rate was adjusted to maintain an exit gas rate of 200–500 cc/min. After one hour at temperature and pressure, the reactor slurry was poured into 1 liter isopropyl alcohol, stirred 2–4 hours, filtered, washed with alcohol and vacuum dried.

A titanium catalyst supported on $MgCl_2$ was prepared by combining 5 $MgCl_2$, 1 $TiCl_4$ and 1 ethylbenzoate, dry ball milling 4 days, heating a slurry of the solids in neat $TiCl_4$ 2 hours at 80° C., washing with n-heptane and vacuum drying. The catalyst contained 3.78% Ti. Portions of this catalyst preparation were used in the experiments shown in Table 1. Various control runs are shown for comparison with the cocatalysts of this invention (Runs A–F).

The sec-butyl magnesium was obtained from Orgmet and contained 72% non-volatile material in excess of the s-$Bu_2Mg$ determined by titration. IR, NMR and GC analyses showed the presence of butoxide groups and 0.07 mole diethyl ether per s-$Bu_2Mg$. The various s-BuMgX compounds were prepared directly by reacting an equimolar amount of ROH, RSH, RCOOH, etc. with the s-$Bu_2Mg$.

TABLE 1

(0.2 g Catalyst, 500 ml n-$C_7$, 65° C., 1 hr.)

| Run | Mmoles Al Cpd | Mmoles Mg Cpd | Mmoles Base | Rate g/g Cat/hr | % HI |
|---|---|---|---|---|---|
| Control | 1 $AlEt_2Cl$ | — | — | 47 | 67.1 |
| Control | 1 $AlEt_3$ | — | — | 326 | 82.6 |
| Control | 1 $AlEt_2Cl$ | 0.83 (s-$Bu)_2Mg$ | — | 165 | 80.5 |
| Control | 1 $AlEt_3$ | 0.83 (s-$Bu)_2Mg$ | — | 6 | — |
| Control | — | 0.83 (s-$Bu)_2Mg$ | — | 0 | — |
| Control | — | 0.83 s-BuMgCl | — | 0 | — |
| A | 1 $AlEt_2Cl$ | 1 s-Bu Mg OOC$\phi$ | — | 165 | 95.2 |
| B | 1 $AlEt_2Cl$ | 1-s-Bu Mg $OC_{15}H_{31}$ | — | 276 | 91.7 |
| C | 1 $AlEt_2Cl$ | 1 s-Bu $MgOC_2H_5$ | — | 261 | 91.4 |
| D | 1 $AlEt_2Cl$ | 1 s-Bu $MgSC_{12}H_{25}$ | — | 310 | 93.2 |
| E | 1 $AlEt_2Cl$ | 0.83 s-Bu MgCl | 1 $Et_3N$ | 100 | 94.6 |
| F | 1 $Et_2AlOOC\phi$ +1 Et (s-Bu)AlCl | 1 s-BuMgCl | — | 351 | 90.5 |

Compared to the control runs, which gave either low activity or low percent heptane insolubles (% HI), the new cocatalyst combinations gave high activity and stereospecificity (<90% HI).

EXAMPLE II

A second catalyst preparation 2.68% Ti was made following the procedure of Example I except that a preformed 1:1 complex of $TiCl_4.\phi COOEt$ was used. In Runs G and H, the s-$BuMgCl.Et_2O$ was obtained by vacuum stripping an ether solution of the Grignard reagent. In Run I, the n+s BuMgOOC$\phi$ was made by reacting pure (n+s Bu)$_2$Mg with benzoic acid. Propylene polymerizations were carried out as in Example I (Table 2).

TABLE 2

| Run | Mmoles Al Cpd | Mmoles Mg. cpd | Mmoles Base | Rate g/g Cat/hr. | % HI |
|---|---|---|---|---|---|
| G | 1 $AlEtCl_2$ | 1 s-BuMgCl | 1 $Et_2O$ | 0 | — |
| H | 1 $AlEt_2Cl$ | 1 s-BuMgCl | 1 $Et_2O$ | 132 | 93.1 |
| I | 1 $AlEt_3$ | 1 n + s-BuMgOOC$\phi$ | — | 123 | 89.7 |

Run G shows that monoalkyl aluminum compounds are not effective in combination with the monoorganomagnesium compounds in this invention. In contrast, a companion patent application shows that such monoalkyl aluminum compounds are preferred when diorganomagnesium compounds are used.

Runs H and I show that dialkyl and trialkyl aluminum compounds are required for this invention.

EXAMPLE III

The procedure of Example II was followed except that various magnesium compositions were used in combination with $AlEt_2Cl$ and in some cases with Lewis base (Table 3). The Mg compounds were prepared as in Example I and II except for Run N in which pure s-$Bu_2Mg$ was reacted with s-butanol.

TABLE 3

| Run | Mmoles Mg Cpd | Mmoles $AlEt_2Cl$ | Mmoles Base | Rate | % HI |
|---|---|---|---|---|---|
| J | 1 n + s-BuMg neodecanoate | 2 | 0 | 480 | 73.9 |
| K | Same as J | 1 | 0 | 381 | 90.8 |
| L | 1 n-$C_{10}H_{21}$MgBr | 1 | ½ $Et_2O$ | 60 | 95.5 |
| M | 1 n-$C_6H_{13}$MgOOC$\phi$ | 1 | 0 | 84 | 93.0 |
| N | 1 s-BuMgOs-Bu | 1 | ½ $Et_2O$ | 107 | 94.6 |

TABLE 3-continued

| Run | Mmoles Mg Cpd | Mmoles AlEt$_2$Cl | Mmoles Base | Rate | % HI |
|---|---|---|---|---|---|
| O | 0.45 n + s-BuMgOOCφ<br>0.55 n + s-BuMgOsBu<br>0.55 s-BuOMgOOCφ | 1 | 0.6 Et$_2$O | 101 | 95.9 |

Comparison of Runs J and K shows that decreasing the Al/Mg ratio from 2:1 to 1:1 gave a large increase in the percent heptane insolubles. Runs L-N show the results obtained with a variety of organic groups and anions on the mgnesium component, as well as with added diethyl ether. Run O shows that excellent results were obtained with a mixture of the various components.

EXAMPLE IV

Propylene was polymerized at 690 kPa pressure in a 1 liter stirred autoclave at 50° C. for 1 hour using the supported TiCl$_4$ catalyst of Example II (Table 4). The Mg compound was made as in Example I, Run A.

TABLE 4

| Run | g. Cat | Mmoles Mg Cpd | Mmoles AlEt$_2$Cl | Solvent | Rate | % HI |
|---|---|---|---|---|---|---|
| P | 0.05 | 0.5 s-BuMgOOCφ | 0.5 | n-C$_7$ | 1292 | 89.9 |
| Q | 0.10 | 0.4 s-BuMgOOCφ | 0.4 | n-C$_7$ | 317 | 96.9 |
| R | 0.10 | 0.4 s-BuMgOOCφ | 0.4 | Xylene | 517 | 96.5 |

Comparison of Runs P and Q shows that the lower alkyl metal/catalyst ratio in Q gave higher heptane insolubles. Run R in xylene diluent gave higher activity than Q in heptane.

Since many modifications and variations of this invention may be made without departing from the spirit or scope of the invention thereof, it is not intended to limit the spirit or scope thereof to the specific examples thereof.

What is claimed is:

1. An improved catalyst composition adaptable for use in an alpha-olefin polymerization which consists of:
   (a) TiCl$_4$ supported on MgCl$_2$, said TiCl$_4$ supported on MgCl$_2$ prepared by ball milling said TiCl$_4$, MgCl$_2$ and ethyl benzoate;
   (b) diethylaluminum chloride; and
   (c) a mono-organomagnesium compound having the formula:
   R'MgX
   wherein R' is a sec-butyl group and X is selected from the group consisting of Cl, OOCφ, OC$_{15}$H$_{31}$, OC$_2$H$_5$, SC$_{12}$H$_{25}$ and Os-Bu.

* * * * *